United States Patent
Shen

(10) Patent No.: US 9,525,600 B1
(45) Date of Patent: Dec. 20, 2016

(54) FORMATTING VALUES IN CUSTOM COMPONENT ON CLOUD PLATFORM

(71) Applicant: CA, Inc., Islandia, NY (US)

(72) Inventor: Tony Shen, Beijing (CN)

(73) Assignee: CA, Inc., New York, NY (US)

( * ) Notice: Subject to any disclaimer, the term of this patent is extended or adjusted under 35 U.S.C. 154(b) by 277 days.

(21) Appl. No.: 13/778,986

(22) Filed: Feb. 27, 2013

(51) Int. Cl.
*G06F 3/048* (2013.01)
*H04L 12/24* (2006.01)

(52) U.S. Cl.
CPC ..................................... *H04L 41/22* (2013.01)

(58) Field of Classification Search
CPC .... G06F 15/16; G06F 17/248; G06F 17/2247; G06F 9/4448; G06F 17/211; G06F 17/218; H04N 2201/3253
See application file for complete search history.

(56) References Cited

U.S. PATENT DOCUMENTS 6,662,340 B2 * 12/2003 Rawat et al. ............... 715/236
6,957,385 B2 * 10/2005 Chan et al. ................ 715/220
2002/0174196 A1 * 11/2002 Donohoe et al. ........... 709/219
2007/0244853 A1 * 10/2007 Schneider ............ G06F 9/4448
2013/0271381 A1 * 10/2013 Lazaridis .................. 345/171

OTHER PUBLICATIONS

"Multi-locale site management with IBM Workplace Web Content Management", IBM, Oct. 2007, Mark Hampton, David de Vos, Melissa Howarth.*
Wikipedia, the free encyclopedia, *JQuery-formatCurrency*, http://code.google.com/p/jquery-formatcurrency/wiki/Usage , accessed Oct. 10, 2012.

* cited by examiner

*Primary Examiner* — Namitha Pillai
(74) *Attorney, Agent, or Firm* — Myers Bigel, P.A.

(57) ABSTRACT

In a method of displaying data in a locale-specific format, a template is generated based on an output of a server of a computing platform. The output is indicative of first format information associated with a first locale. Data is received for display in a user interface of the computing platform, and the template is populated based on the received data to provide a populated template. The populated template includes second format information associated with a second locale that is different from the first locale. The populated template may further include the first format information associated with the first locale. The populated template is provided for display in the user interface of the computing platform.

22 Claims, 6 Drawing Sheets

FIGURE 3A

Organization Edit
General Information

- Organization Name: CA
- Primary Contact: enqueue org.RWC-2950-1
- Division:
- Currency Locale: English (United States)

335 — (bracket for General Information section)
301 → (arrow pointing to Currency Locale)

FIGURE 3B

Custom Fields & Relationships                    [New] [Field Dependencies]

| Action | Field Label | API Name | Data Type |
|---|---|---|---|
| Edit \| Del | negativeMoney | negativeMoney__c | Currency(1, 0) |
| Edit \| Del | positiveMoney | positiveMoney__c | Currency(1, 0) |

302 — (bracket)
305A → Field Label (negativeMoney)
305B → Field Label (positiveMoney)
304A → Data Type (Currency(1,0)) 303A
304B → Data Type (Currency(1,0)) 303B

FIGURE 3C

Financial Benefits: 40000 — 305

Planned Cost: $14,000.00 — 300

Show: 10   Items 11 - 17   Total 17

| Release Name | Active | Product | Actual Cost | Target Cost | Target vs Planned Cost |
|---|---|---|---|---|---|
| Release Z | ✓ | Global POS System | $0.00 | $0.00 | $0.00 |
| Web-Based Trading Fall 201... | ✓ | Web-Based Trading | $0.00 | $0.00 | ($100,000.00) |
| Web-Based Trading Fall 2012 | ✓ | Web-Based Trading | $40,000.00 | $0.00 | ($90,000.00) |
| Web-Based Trading Spring ... | ✓ | Web-Based Trading | $0.00 | $0.00 | ($620,000.00) |
| Web-Based Trading Summer... | ✓ | Web-Based Trading | $0.00 | $0.00 | ($20,000.00) |
| Web-Based Trading Winter ... | ✓ | Web-Based Trading | $0.00 | $0.00 | $0.00 |
| Web-Based Trading Winter ... | ✓ | Web-Based Trading | $0.00 | $0.00 | ($20,000.00) |

Show: 10   Items 11 - 17   Total 17

306 → ($40,000.00)

FORMATTING VALUES IN CUSTOM COMPONENT ON CLOUD PLATFORM

BACKGROUND

The present disclosure relates to computer systems, and more specifically, to cloud computing platforms.

Cloud computing is the use of computing resources (hardware and software) that are delivered as a service over a network (typically the Internet). Cloud computing entrusts remote services with a user's data, software and computation.

Platform as a service (PaaS) is a category and service model of cloud computing services that provide a computing platform and a solution stack as a service. In this model, a user can create software applications using tools and/or libraries from the provider. For example, PaaS offerings may allow customization of existing Software-as-a-Service (SaaS) applications. The user can also control software deployment and configuration settings. The provider provides the networks, servers, storage and other services.

PaaS offerings typically attempt to support use of the application by many concurrent users, by providing concurrency management, scalability, fail-over and security. The architecture can define "trust relationships" between users in security, access, distribution of source code, navigation history, user (people and device) profiles, interaction history, and application usage across web services, databases and networks. PaaS offerings may also support various interfaces to create compositions of multiple web services (sometimes called "mashups") as well as access databases and re-use services maintained inside private networks. PaaS offerings can facilitate the deployment of applications without the cost and complexity of buying and managing the underlying hardware and software and provisioning hosting capabilities.

PaaS offerings can thus provide systems that developers use to build multi-tenant applications hosted on their servers as a service. Such applications may be used by multinational clients. For example, Force.com is a cloud computing platform as a service for creating and deploying applications for social enterprises.

BRIEF SUMMARY

Systems, methods, and computer program products for formatting and displaying data in a locale-specific format are disclosed.

According to an embodiment of the present disclosure, in a method of displaying data in a locale-specific format, data is received for display in a user interface of a computing platform, and a template is populated based on the data to provide a populated template. The populated template includes at least one of first format information associated with a first locale and second format information associated with a second locale that is different from the first locale. The populated template is provided for display in the user interface of the computing platform.

In an embodiment, the template may be generated based on an output of a server of the computing platform. The output of the server may be indicative of the first format information. For example, the output may be received from a software component executing on the server responsive to access a stored profile that indicates the first locale and/or the first format information.

In an embodiment, the template may be populated by a client of the computing platform. The second format information may be indicated by data that is accessible to the client. For example, the second format information may be determined from a stored profile that indicates the second locale, which may be accessible to a software component executing on the client.

In an embodiment, stored data that is indicative of the first format information may be inaccessible by the client of the computing platform. For example, the computing platform may not provide an interface that allows the client to access the first format information.

In an embodiment, the template may be generated by the client. In particular, the output of the server may be received at the client, the first format information may be extracted from the output of the server, and the template may be generated to include the first format information.

In an embodiment, a profile corresponding to a user of the client may be accessed to determine the second format information. The received data may be formatted or otherwise modified to include the second format information responsive to accessing of the profile, and the template may be populated with the modified data.

In an embodiment, a mock object including at least one field specifying a data type may be defined. An instance of the mock object may be rendered by the server based on the specified data type to provide the output indicative of the first format information prior to generating the template.

In an embodiment, the mock object may include first and second fields corresponding to first and second indicators for the data type, and rendering of the instance of the mock object may result in first and second outputs. A first template associated with the first indicator and a second template associated with the second may be generated based on the first and second outputs, respectively, and the first and second templates may be stored in the user interface. One of the first and second templates may be populated based on a presence of one of the first and second indicators in the received data.

In an embodiment, the populated template including the first format information and the second format information may be displayed by the client in the user interface responsive to receiving the data for display in the user interface.

In an embodiment, the output may be received from an existing software component of the computing platform that is executed on the server, and the populating may be performed by a custom software component of the computing platform executing on a client of the computing platform.

In an embodiment, the first locale may correspond to a geographic location of an entity for which the computing platform is deployed, and the second locale may correspond to a geographic location of one of a plurality of users associated with the entity.

In an embodiment, the first format information may be currency information (such as a currency symbol) corresponding to the geographic location of the entity, and the second format information may be separator symbol information corresponding to the geographic location of the one of the plurality of users.

It is noted that aspects described with respect to one embodiment may be incorporated in different embodiments although not specifically described relative thereto. That is, all embodiments and/or features of any embodiments can be combined in any way and/or combination. Moreover, other systems, methods, and/or computer program products according to embodiments will be or become apparent to one with skill in the art upon review of the following drawings and detailed description. It is intended that all such additional systems, methods, and/or computer program products be included within this description, be within the scope of the present disclosure, and be protected by the accompanying claims.

BRIEF DESCRIPTION OF THE DRAWINGS

Aspects of the present disclosure are illustrated by way of example and are not limited by the accompanying figures with like references indicating like elements.

FIGS. 3A-3C illustrate example user interfaces for providing locale-specific formatting and display of data in accordance with an embodiment of the present invention.

DETAILED DESCRIPTION

Figure 1:
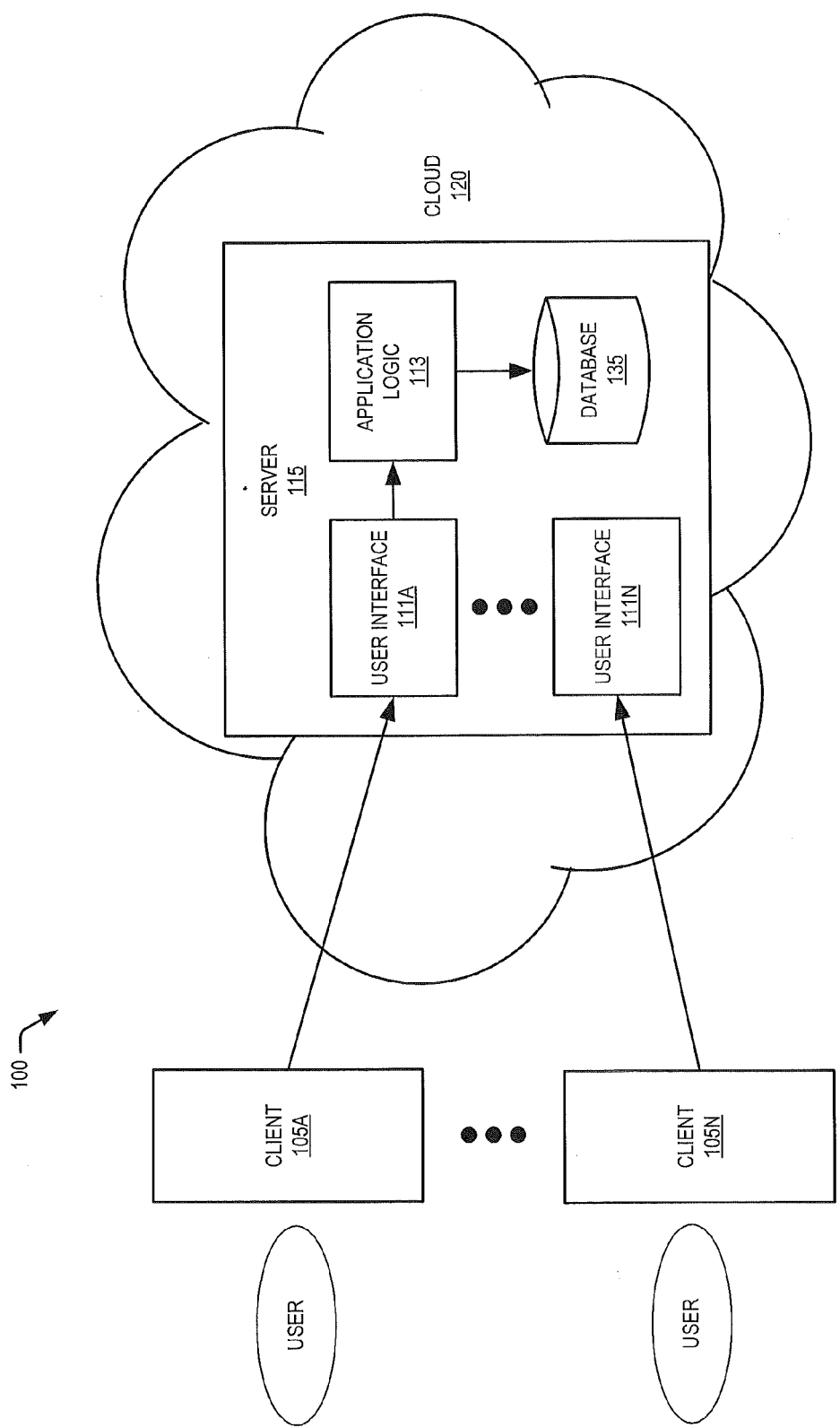
FIG. 1 is a block diagram illustrating an example computing platform that provides locale-specific formatting and display of data in accordance with an embodiment of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

As described herein, a computing system or platform may include one or more hosts, operating systems, peripherals, and/or applications. Machines in a same computing system or environment may have shared memory or resources, may be associated with the same or different hardware platforms, and/or may be located in the same or different physical locations. Computing systems described herein may refer to a virtualized environment (such as a cloud environment) and/or a physical environment.

As used herein, a software component may refer to one or more software applications that are encapsulated or otherwise separated into distinct sections to address separate concerns, where each concern may refer to a set of functions or data that affects the code of a computer program. For example, a user interface may include multiple software components that supply information to be displayed in the user interface. For coordination, components may communicate with each other via interfaces, which may specify the services that other components can utilize and/or services that the component itself needs, without specifying implementation details. Also, a locale may refer to a set of parameters, such as a specification of language, country, and/or other preferences, based on a corresponding geographic location or region. The locale parameters or settings may be used to format received data.

Some embodiments of the present disclosure may arise from realization that, for an application on a cloud computing platform that is used by an organization having employees or other associated users in different geographic regions, it may be desirable to format values or other data to be displayed according to a particular locality, to maintain consistency and accuracy with respect to the formatting that is used on an organization-wide basis. For example, while the organization may specify the use of particular currency type and/or currency symbol according to the currency locale setup of the organization, it may be helpful or otherwise advantageous for the users at different corporate locations to format the monetary values according to the locale of a user (for example, using locale-specific separator symbols such as decimals, colons, and/or commas). However, data received at the client-side of the computing platform may not indicate such formatting parameters, and many cloud computing platforms, such as Force.com, may not provide an application program interface (API) to format a number to currency format and/or to retrieve the currency symbol according to the user's locality. Indeed, some such platforms may permit the use of only a fixed format identifier symbol (such as '$' for currency), which may be inconvenient for international users.

Accordingly, some embodiments of the present disclosure can enable a client-side component of a computing platform to format, convert, or otherwise modify received data to include format information for one or more localities, even where the received data does not include an indication of a desired format. In particular, embodiments of the present disclosure may leverage the output of a server-based component of the computing platform to generate and populate one or more templates. The populated template(s) may include some format information that is specific to the locale of a business or other entity, and/or other format information that is specific to the locale of a user associated with the business/entity. Operations for locale-specific formatting as described herein can be used to provide (but is not limited to) number formatting, date-time formatting, currency formatting, units/standard of measurement formatting, and/or other formatting for data that may vary from one locale to another.

FIG. 1 is a block diagram illustrating an example computing environment or platform 100 that is configured to provide locale-specific formatting and display of data in accordance with an embodiment of the present disclosure. As shown in FIG. 1, the computing platform 100 includes a plurality of clients 105a-105n and a server 115. The server 115 is configured to host one or more applications to provide one or more services to the clients 105a-105n. The server 115 includes application logic 113 for the service(s) provided thereby, and one or more databases 135 that store data used in providing the service(s). The server 115 can thereby render or construct respective user interfaces 111a-111n for the clients 105a-105n. For example, where the server 115 hosts web-based applications, the user interfaces 111a-111n may be respective web pages, and the clients 105a-105n may include respective web browsers that are configured to display the web pages. The user interfaces 111a-111n may (depending on the associated application logic 113) be configured to interact with the database(s) 135 and/or invoke external web service calls before returning respective views to the clients 105a-105n. Thus, the environment 100 of FIG. 1 can provide a service model for cloud computing.

The clients 105a-105n and/or the server 115 may include, without limitation, a mainframe computer platform, personal computer, mobile computer (e.g., tablet computer), server, wireless communication terminal (e.g., cellular data terminal), or any other appropriate program code processing hardware. The clients 105a-105n and/or the server 115 may include computer resources such as a processing hardware (e.g., central processing unit, CPU); networking controllers; communication controllers; a display unit; a program and data storage device; memory controllers; input devices (such as a keyboard, a mouse, etc.) and output devices such as printers. The processing hardware may include circuit(s) configured to execute computer program code from memory device(s), described below as a computer readable storage medium, to perform at least some of the operations and methods described herein, and may be any conventional processor circuit(s), such as the AMD Athlon™ 64, or Intel® Core™ Duo. The clients 105a-105n and/or the server 115 may further include respective data storage spaces (such as the database 135), which may include any suitable devices capable of storing computer-readable data and program code, as well as logic in the form of software applications, random access memory (RAM), or read only memory (ROM), removable media, or any other suitable memory component.

The clients 105a-105n and the server 115 may represent any combination of physical and/or virtual systems that are cooperatively configured to provide applications and/or services to respective users via the user interfaces 111a-111n. The user interfaces 111a-111n shown in FIG. 1 are rendered or composed by the server 115, and are respectively displayed on the corresponding clients 105a-105n, for example, via a web browser. The user interfaces 111a-111n may thus provide client-side presentation, but may have server-side access to data and logic.

Figure 2:
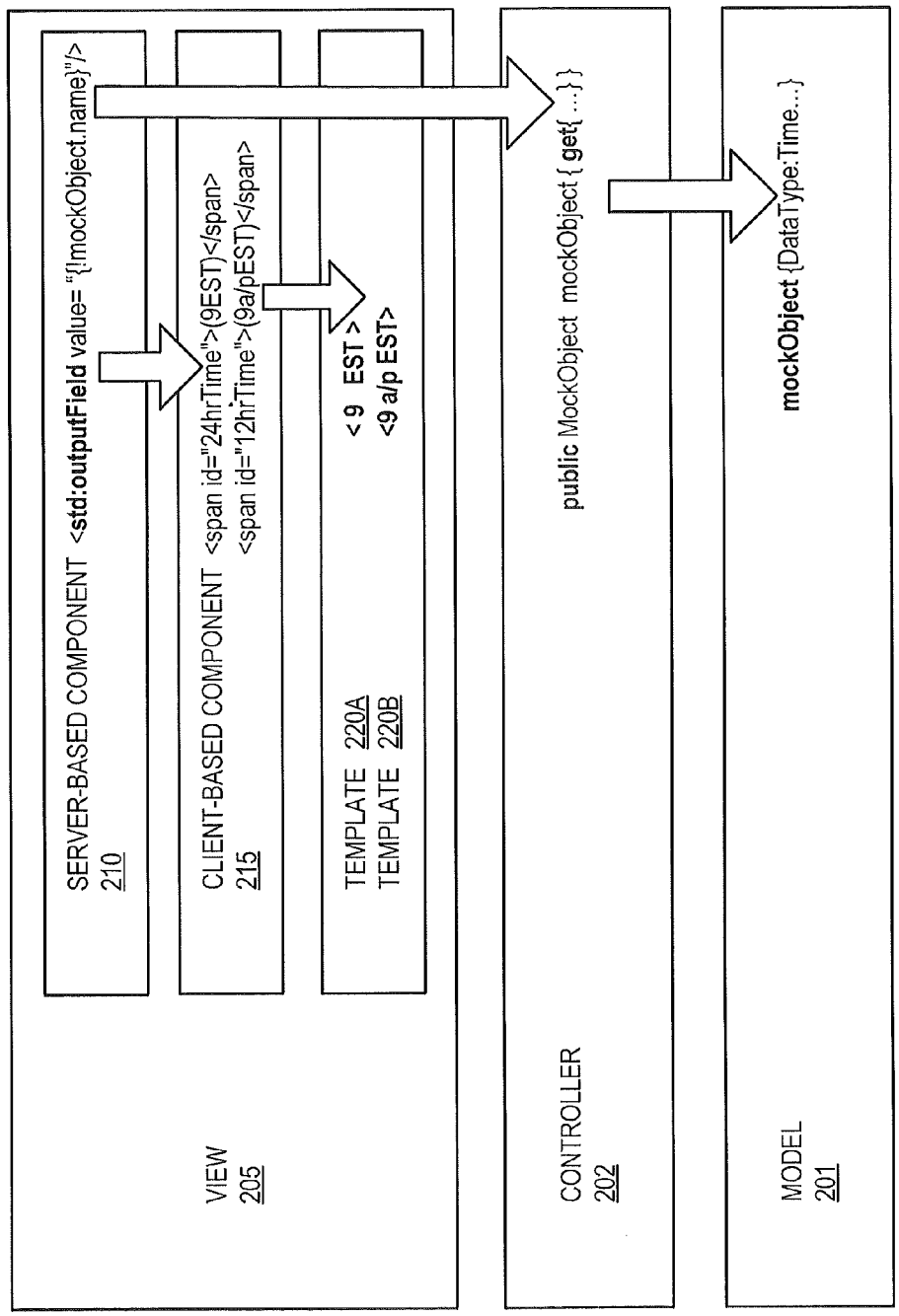
FIG. 2 is a block diagram illustrating a model view controller (MVC) architecture that provides locale-specific formatting and display of data in accordance with an embodiment of the present invention.

FIG. 2 illustrates presentation, logic, and data layers of the present disclosure according to a model view controller (MVC) architecture 200. As shown in FIG. 2, the view 205 provides the presentation layer, and requests from the model 201 information needed to generate an output representation (for example, the user interfaces 111a-111n of FIG. 1). The model 201 provides the data layer, and may be defined by objects and/or classes. The controller 202 provides the logic layer, and can send commands to the model 201 (for example, to update the model's state) or to the view 205 (for example, to change the view's presentation of the model 201). In some web-based embodiments, the model 201, view 205, and controller 202 logic may be implemented on the server 115, and the clients 105a-105n may send hyperlink requests or form input to the controller 202 and receive a complete and updated web page from the view 205. In other embodiments, one or more MVC components may execute at least partly on the clients 105a-105n.

Referring to the architecture of FIG. 2, some computing platforms, such as Force.com, may set numerical data (such as currency, dates, times, and/or other data having a format that varies based on geographic location) according to a locale of a company or business entity for which the computing platform is used or deployed. However, the computing platform may not provide an interface to determine formatting for the data (for example, an API to retrieve the locale-specific symbol(s) or code(s) used by the company/entity).

Embodiments of the present disclosure can leverage the output of a server-based component (which is configured to configured to render data such that the output at the client side reflects the locale of the company) to create one or more templates for formatting received data using one or more client-based components (which can use an API to determine locales of respective users). To do so, with reference to FIG. 2, a mock object including one or more fields is defined in the model 201. For example, the fields may be provided for a 'Time' data type (e.g., Hour:Minutes:Sec), and the mock object may include two fields, one for 24-hour clock time values and one for 12-hour clock time values. The mock object may be defined as having a field length of 'one', indicating that the mock object can accept a one-digit number (which may be used as a placeholder value, as described below).

An instance of the mock object is created by the controller 202, and one or more values for the fields are set. For instance, the positive field value may be set to '9' and the negative field value may be set to '−9', where the number 9 is provided by way of example as a placeholder.

The mock object instance is rendered in the view 205 by the server-based component 210 to provide an output indicating the set values of the fields of the mock object. For example, the server-based component 210 may be configured to read configuration data from a stored profile (for example, from the database 135 of FIG. 1), which may indicate the locale of an entity or organization, including a corresponding time zone (for example, Eastern Standard Time EST). The server-based component 210 may format the values of the fields of the mock object based on this locale, and may provide this output to the client side. In the above example, the server-based component 210 may output HTML tags 'span' including the values '9 EST' and '−9 EST' responsive to rendering the mock object instance. The view 205 can also include one or more client-based components 215.

The values may be extracted from the output of the server-based component 210 by the client-based component 215, and stored as first format information in respective templates 220a, 220b in the view 205, one (220a) for the 24-hour clock time values and one (220b) for the 12-hour clock time values.

Accordingly, a received value (such as 3:00 pm) can be formatted, converted, or otherwise modified by the client-based component 215 to include second format information according to a user's locale setup. For example, the client-based component 215 may determine (for instance, from a stored user profile) that the user is located Europe, and thus, uses the 24-hour clock format. In this example, the client-based component 215 can recognize the 'pm' in the received value as an indicator of a 12-hour clock format, remove the 'pm' indicator, modify the received value '3' to the 24-hour clock format '15:00' corresponding to the user's locale, and populate the 24-hour template 220a with the modified value, such that the populated template includes '15:00 EST'. The client-based component 215 may thereby provide the populated template 220a for display or presentation. Embodiments of the present invention may be similarly used to display day/date formats (e.g. Month/Day/Year to Day/Month/Year), and/or currency formats (e.g. 1,000.00 to 1.000,00) as described in greater detail below with reference to the example of FIGS. 3A-3C.

Figure 4:
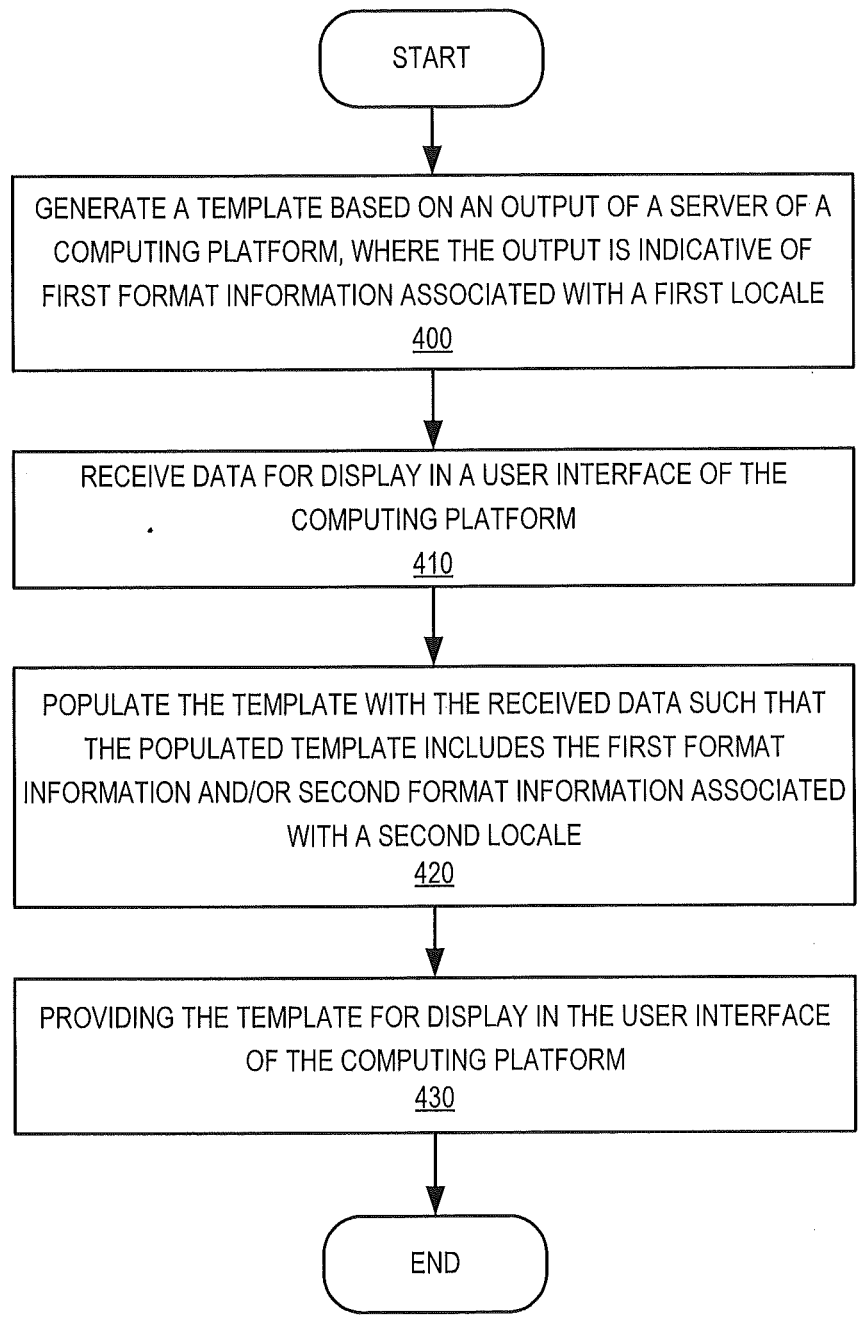
FIG. 4 is a flowchart illustrating operations for displaying locale-specific data in accordance with embodiments of the present disclosure.

FIG. 4 is a flowchart illustrating operations for displaying locale-specific data in accordance with embodiments of the present disclosure. Referring now to FIG. 4, at least one template is generated based on an output of a server of a computing platform at block 400. The output is indicative of first format information associated with a first locale. For example, the first format information may be associated with a locale of a business entity (such as a corporation or organization) for whom the computing platform is deployed, and may be indicated by data (for instance, a stored profile for the entity) that is accessible to the server of the computing platform. The stored profile for the entity may be accessed by a server-based component of the computing platform to dynamically determine the first locale and/or the first format information.

Still referring to FIG. 4, data to be displayed on a user interface of the computing platform is received at block 410. The data may be a numerical value having a format that varies based on geographic location, such as currency, day/date, and/or time. The data may be received at a client of the computing platform, for instance, from a user or from the server. The computing platform may be web-based, and thus, the user interface may be provided as a web page of the computing platform that is rendered by the server and displayed by the client.

At block 420, the template is populated with the received data. Once populated, the template includes the first format information associated with the first locale and/or second format information associated with a second locale that is different from the first locale. For example, the second format information may be associated with a locale of one of a plurality of users (such as an employee or contractor) associated with but remotely located from the locale of the business entity, and may be indicated by data (for instance, a stored user profile) that is accessible to a client of the computing system. However, the stored profile for the entity (which indicates the first locale and/or first format information) may not be accessible by the client of the computing system in some embodiments.

In some embodiments, the template may be initially generated at block 400 based on the output of the server to include the first format information, the data received at block 410 may be modified to include the second format information, and the template may be populated at block 420 with the modified data. For example, the template may be generated to include a currency symbol according to the locale of the entity (based on the output of the server), and may be populated with a received numerical value that is modified at the client to include one or more separator symbols (such as periods, colons, and/or commas) according to the locale of the user.

The populated template is provided for display in the user interface of the computing platform at block 430. In the currency example above, the populated template (including the currency symbol corresponding to the entity's locale and the numerical value formatted to include the separator symbols corresponding to the user's locale) may be displayed in a web page by the client of the computing platform. As such, in this example, the operations for receiving, populating, and providing may be performed by a software component executing on the client (e.g., a client-based component). However, it will be understood that embodiments of the present invention are not limited to such an implementation, and one or more of such operations may be performed by a software component executing on the server (e.g., a server-based component), or by respective software components executing on the server and the client in some embodiments.

Also, although discussed above with reference to an example where the populated template includes both the first format information associated with the locale of the entity and the second format information associated with the locale of the user, it will be understood that the populated template may include only the second format information (e.g., for the user's locale) in some embodiments. Alternatively, the template may be hard-coded to include the first format information (e.g., for the entity's locale), rather than dynamically determining the first format information from the output of the server as discussed above.

Figure 5:
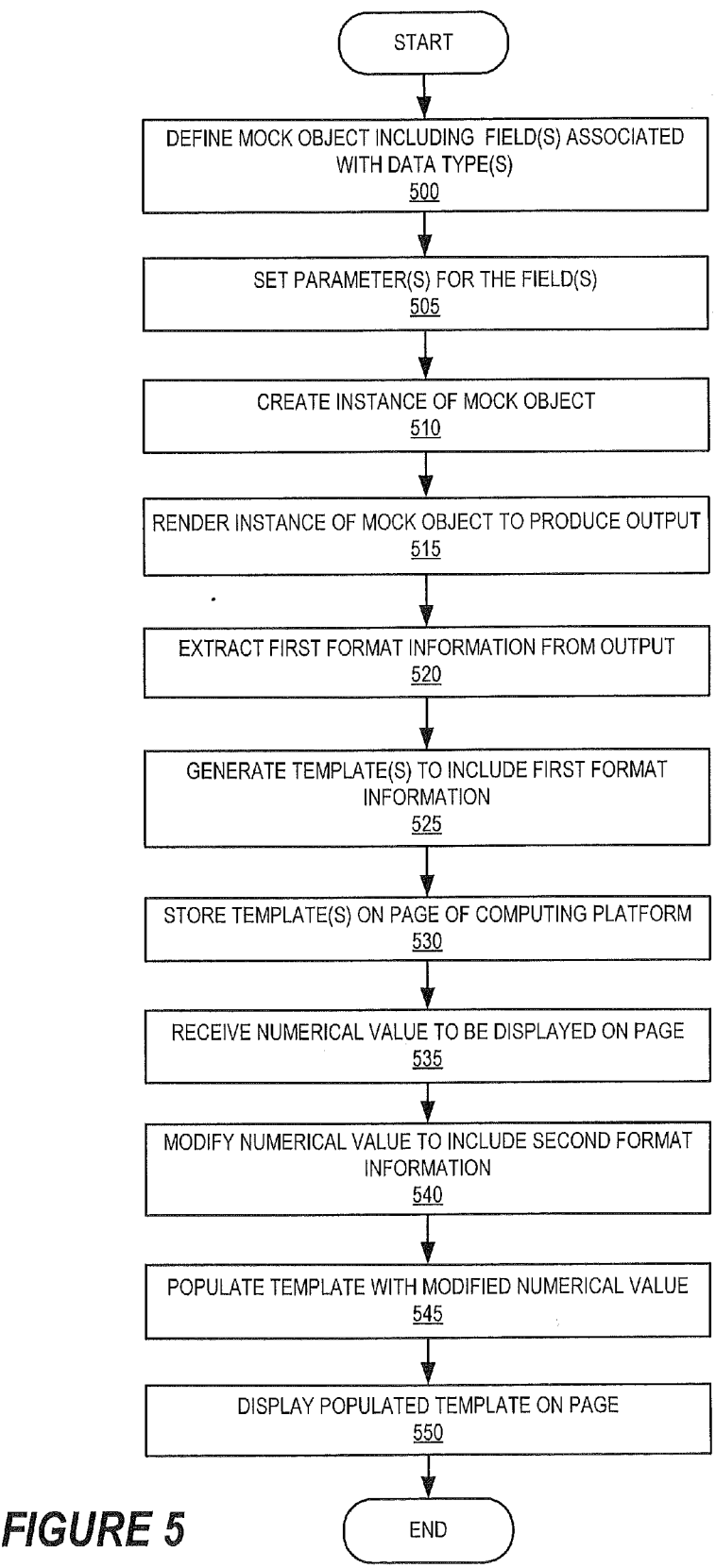
FIG. 5 is a flowchart illustrating operations for displaying locale-specific data in accordance with embodiments of the present disclosure in greater detail.

FIG. 5 is a flowchart illustrating operations for converting and displaying locale-specific data in accordance with embodiments of the present disclosure in greater detail. Referring now to FIG. 5, a mock object for the computing platform is defined at block 500. The mock object includes at least one data field associated with a respective data type. For example, where the data type is currency, the mock object may include two fields, that is, a field for positive values and a field for negative values. At block 505, one or more parameters for the field(s) are set. In particular, for the currency example, the length of the positive and negative fields may each be set to 'one', such that each field accepts a one-digit number. An instance of the mock object, including value(s) for the field(s), is created at block 510. The values stored in the field(s) may be placeholders for the numerical value to be displayed. In the above example, the positive field value may be set to 9, and the negative field value may be set to −9, where the number 9 is used as a placeholder for subsequent operations.

The instance of the mock object is rendered using an already existing (or "standard") server-based software component of the computing platform to produce an output at block 515. The instance may be rendered on a page that also includes a client-based software component (for example, a "custom" component) of the computing platform. The client-based software component may be written using a scripting language, such as JavaScript. The output of the server-based component includes or is otherwise indicative of first format information for the data type specified in the field(s) of the mock object, and the first format information is extracted from the output at block 520. The first format information may be determined from or may be otherwise associated with a locale of an entity (such as a corporation or organization) that utilizes the computing platform. For example, where the data type is currency, the first format information may include a currency symbol corresponding to the currency of the entity's locale, and/or an indicator (such as a positive or negative value) for the currency. Alternatively, where the data type is time, the first format information may include a symbol or abbreviation corresponding to a time zone of the entity's locale. The server-based component may dynamically read or otherwise access the first format information from a stored profile for the entity, for example, as may be stored in a database associated with the computing platform. The output may also include the placeholder value that was stored in the data field of the mock object. For example, the output may be an HTML tag including the currency symbol, the placeholder value, and the positive/negative indicator information.

At block 525, at least one template is generated or otherwise created based on the first format information extracted from the output of the server-based software component. The template(s) may be created by the client-based software component that executes on the client-side, and may be populated with the first format information. For example, where the first format information includes a currency symbol for a currency of the locale of the entity, the template(s) may be populated with the currency symbol. Furthermore, where the data type is currency, two templates may be created, one for positive currency values and one for negative currency values, each of which may be populated with the currency symbol. The template(s) are stored on the same page including the client-based software component of the computing platform at block 530.

A numerical value to be displayed on the page is received at block 535. The numerical value may be associated with the data type that was defined in the field of the mock object. The numerical value may be received at a client of the computing platform from a user and/or from a server associated with the computing platform. However, when the numerical value is received at the client, it may lack formatting or configuration information. For example, a user may enter a number '1000' in a currency input field shown on a web page, without indication of the currency symbol and/or separator symbol desired by the user. As such, at block 540, the numerical value is formatted or otherwise modified in accordance with second format information for the data type. The second format information is determined from or otherwise associated with a locale of the user. For example, with respect to the currency data described above, the second format information may be a separator symbol (such as a decimal or a comma) and/or an indication of a number of decimal places or trailing zeros for display of a numerical value. The locale of the user may be indicated by a stored user profile for the user. The stored user profile may be dynamically accessed by the client-based software component and/or by the server-based software component (for instance using an available API) to determine the second format information in some embodiments.

At block 545, the template (including the first format information) is populated with the numerical value that is formatted or otherwise modified in accordance with the second format information. In particular, the placeholder value in the template may be replaced with the formatted numerical value. In the event that the received numerical value has a positive or negative value, the positive or negative value indicator (e.g., the + or − sign) may be removed, and one of the templates corresponding to the removed value indicator (e.g., the positive or negative template) may be populated with the numerical value in place of the placeholder value. The populated template is displayed on the page at block 550. Accordingly, in the currency example, the numerical value is displayed with the separator symbol(s) indicated by the second format information (e.g., based on the locale of the user), along with the currency symbol indicated by the first configuration information (e.g., based on the locale of the entity).

Embodiments of the present disclosure will now be described with reference to FIGS. 3A-3C, which illustrates an example where the numerical value to be displayed is a monetary value. However, it will be understood that embodiments of the present disclosure are not limited to the formatting of currency or monetary values, but rather, can be used to format any data that may have differing or locale-specific formatting, including (but not limited to) date and/or time data, units/standards of measurement, case/character conversion, string collation, etc.

As shown in FIG. 3A, the currency locale 301 for an organization or other entity is set in an organization profile 335 that is stored in a database (such as the database 135 of FIG. 1) of a computing platform. In FIG. 3B, a mock object 302 is defined. The mock object 302 includes first and second fields 303a, 303b for positive and negative currency values, respectively. Both fields 303a, 303b include an indication of a data type 304a, 304b ("Currency") and field labels 305a, 305b, but do not specify a particular type or kind of currency.

Still referring to FIG. 3B, a new instance of mockObject is created, and a pre-existing (or "standard") server-based component of the computing platform (such as the server-based component 210 of FIG. 2) is used to render the instance. For example, a mockObject instance may be created as follows:

```
public MockObject_c mockObject {
    get{
        return new MockObject_c(negativeMoney_c=-9,
            positiveMoney_c=9);
    }
}
```

In the user interface 300 of FIG. 3C, the mock object is rendered using the standard component <apex:outputField>:
<apex:outputField id="negativeMoney"
value="{!mockObject.negativeMoney_c}"/>
<apex:outputField id="positiveMoney"
value="{!mockObject.positiveMoney_c}"/>

The standard server-based component <apex:outputField> reads the currency locale 301 from the stored organization profile 335, formats the currency values of mockObject, and outputs the final result (as an HTML tag, below) to the client:
<span id="negativeMoney">($9)</span>
<span id="positiveMoney">$9</span>

In the above example, the locale 301 for the organization is set to 'United States,' and thus, the output includes the dollar sign ($) as the currency symbol. However, if the locale 301 were to be set to 'France,' the standard component <apex:outputField> would provide an output including the euro sign (€) as follows:
<span id="negativeMoney">-9 €</span>
<span id="positiveMoney">9 €</span>

In embodiments of the present disclosure, a custom client-side component (such as the client-based component 215 of FIG. 2) is used to extract the text of the HTML tags <span>("-$9", "$9") and generate one or more templates (such as the templates 220a, 220b of FIG. 2) based on the extracted text. The custom component may be implemented, for example, using JavaScript. In the present example, positive and negative templates are generated, each including the currency symbol ($) corresponding to the locale of the organization:
com.ca.vision.getNegativeMoneyTemplate=function(
){return
Ext.get('{?$Component.negativeMoney}').dom.innerHTML;}
com.ca.vision.getPositiveMoneyTemplate=function(
){return
Ext. get ('{!$Component.positiveMoney}').dom.innerHTML;}

Formatting a monetary value may also require the use of 'separator symbols' (for instance, commas and/or periods), which may vary based on geographic location. For example, in the United States, monetary values may be displayed with commas between every three digits, and a period denoting the separation between whole numbers and fractional values. In contrast, in European countries, these separator symbols may be reversed (e.g., periods are provided between every three digits, and commas separate whole and fractional numbers).

In embodiments of the present disclosure, the client-based custom component is configured to format a received value based on the separator symbol(s) corresponding to the user's locale. In particular, the client-side component may access a user profile that indicates the user's locale to determine the corresponding separator symbols. For example, in the Force.com platform, different users may have different locale configurations, but may share the same currency configuration, and Force.com provides API to get the current user's locale. For instance, the currency locale 301 is set to 'United States' in the organization profile 335 of FIG. 3A, and a current user's locale may also be 'United States.' As such, upon receiving a numerical value '40000' (for example, in a currency-related data field 305 of the user interface 300 shown in FIG. 3C), the custom client-side component determines that currency formatting is needed. As such, the client-side component formats the received numerical value '40000' to '40,000.00' based on the output of the locale API. The client-side component thereby populates the positive template (based on the lack of a negative sign/indicator '−' in the received numerical value) by replacing the placeholder '9' with the modified numerical value '40,000.00'. Accordingly, the populated template provides the value '$40,000.00' (including the currency symbol based on the locale of the organization and the separator symbols based on the locale of the user), which is displayed in a corresponding portion 306 of the user interface 300.

As an alternative example, the currency locale 301 may be set to 'France' in the organization profile 335 of FIG. 3A, and a current user's locale may also be 'France.' As such, upon receiving a numerical value '4000' (for example, in a currency-related data field of the user interface 300 shown in FIG. 3C), the custom client-side component determines that currency formatting is needed. As such, the client-side component removes the negative sign/indicator '−' from the received numerical value '4000', and formats '1000' to '1.000,00' based on the output of the locale API. The client-side component thereby populates the negative template (based on the indicator '−' in the received numerical value) by replacing the placeholder '9' with '1.000,00'. Accordingly, the populated template provides the value '4.000,00 €', which can then be displayed in the user interface 300.

Accordingly, embodiments of the present disclosure provide a client-based component (implemented, for example, using JavaScript) that can leverage an output from an available server-based component to determine locale information for an organization or entity, even if the computing platform does not otherwise provide an interface for the client-based component to obtain such information. Thus, data received at the client side may be formatted in accordance with the organization's locale (as well as in accordance with the user's locale) for display at the client.

For example, some embodiments of the present disclosure can allow for formatting a monetary value at the client side using the Force.com platform. In particular, a "currency symbol" and "indicator symbol" (e.g., positive/negative) may be dynamically retrieved from a Force.com server-based component according to an organization's currency configuration. The "separator symbols" can be generated by a client-based component using an APIs (such as ExtJS) according to a current user's locale configuration. The client-based component can thus generate and populate one or more templates including the currency symbol and indicator symbol from the organization's locale, as well as the separator symbols from the user's locale, to display data in a format that is both convenient for the user and consistent with the organization. Some advantages of the present disclosure may include easier implementation, consistency in format with respect to a standard component output (for example, the currency format may be consistent with a Force.com standard component output), support for as many currency formats as Force.com supports, and/or few to no upgrade issues.

Figure 6:
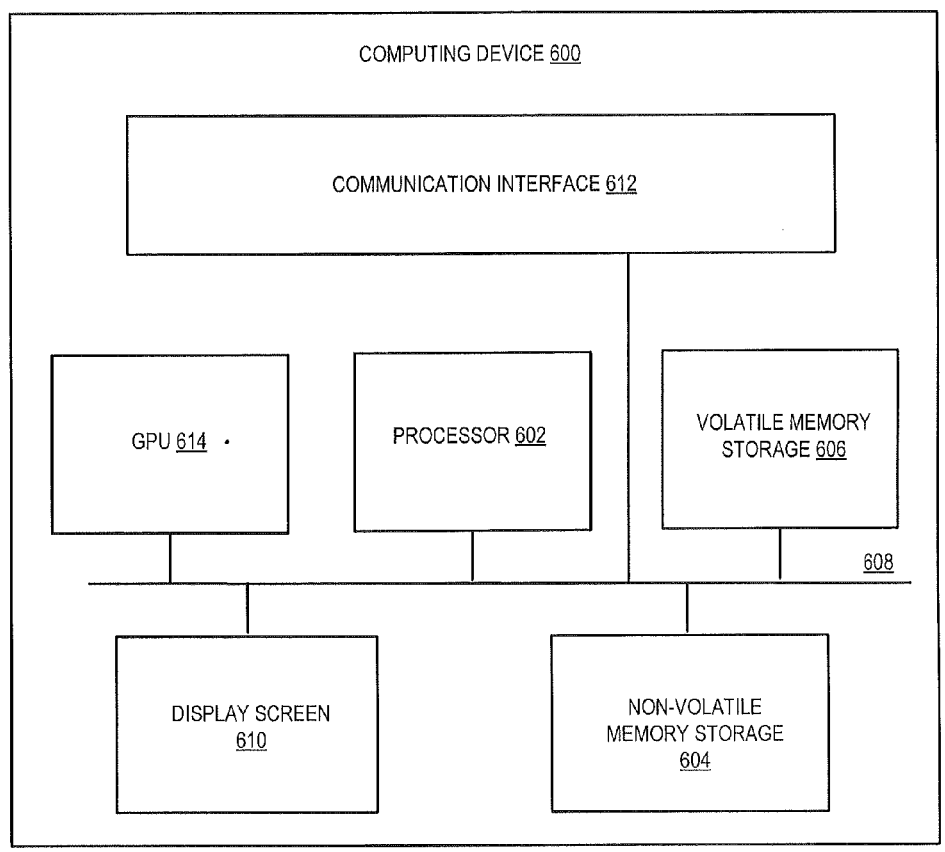
FIG. 6 is a block diagram illustrating an example computer system in which embodiments of the present disclosure, or portions thereof, may be implemented.

FIG. 6 is an example computer system 600 in which embodiments of the present disclosure, or portions thereof, may be implemented. For example, the clients 105a-105n and/or the server 115 may be implemented in one or more computing devices 600 using hardware, software implemented with hardware, firmware, tangible computer-readable storage media having instructions stored thereon, or a combination thereof and may be implemented in one or more computer systems or other processing systems. Computer devices 600 may also be virtualized instances of computers. As such, the devices and methods shown in FIGS. 1-5 may be embodied in any combination of hardware and software.

Computing device 600 may include one or more processors 602, one or more memory devices 604, 606, a communication infrastructure 608, a display screen 610, and a communication interface 612. Computing device 600 may also have networking or communication controllers, input devices (keyboard, mouse, touch screen, etc.) and output devices (printer or display).

Processor(s) 602 are configured to execute computer program code from memory devices 604 or 606 to perform at least some of the operations and methods described herein, and may be any conventional or special purpose processor, including, but not limited to, digital signal processor (DSP), field programmable gate array (FPGA), application specific integrated circuit (ASIC), and multi-core processors.

GPU 614 is a specialized processor that executes instructions and programs, selected for complex graphics and mathematical operations, in parallel, for example, to provide the user interfaces 111a-111n.

Non-volatile memory storage 604 may include a hard disk drive, flash memory, and/or like devices that may store computer program instructions and data on computer-readable media, One or more of the non-volatile memory storage 604 may be a removable storage device.

Volatile memory storage 606 may include one or more volatile memory devices such as, but not limited to, random access memory. Communication infrastructure 608 may include one or more device interconnection buses such as Ethernet, Peripheral Component Interconnect (PCI), and the like.

Typically, computer instructions are executed using one or more processors 602 and can be stored in storage media 604 and/or 606. Display screen 610 allows results of the computer operations to be displayed to a user or an application developer.

Communication interface 612 allows software and data to be transferred between computer system 600 and external devices, such as between clients 105a-105n and server 115 or vice versa. Communication interface 612 may include a modem, a network interface (such as an Ethernet card), a communications port, a PCMCIA slot and card, or the like. Software and data transferred via communication interface 612 may be in the form of signals, which may be electronic, electromagnetic, optical, or other signals capable of being received by communication interface 612. These signals may be provided to communication interface 612 via a communications path. The communications path carries signals and may be implemented using wire or cable, fiber optics, a phone line, a cellular phone link, an RF link or other communications channels. According to an embodiment, a host operating system functionally interconnects any computing device or hardware platform with users and is responsible for the management and coordination of activities and the sharing of the computer resources.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method of displaying data in a locale-specific format, the method comprising:
    performing operations as follows on at least one processor:
    receiving, at a client of a computing platform, an output of a server of the computing platform based on definition of a mock object that specifies a data type, wherein the output of the server is indicative of first format information for the data type that is inaccessible to the client via the computing platform, and wherein the first format information is associated with a first locale;
    generating, at the client, a template comprising the first format information by extracting the first format information from the output of the server;
    receiving data for display in a user interface of the computing platform, wherein the data is of the data type;
    retrieving second format information for the data type wherein the second format information is associated with a second locale corresponding to a geographic location of the client that is different from a geographic location corresponding to the first locale;
    populating the template at the client based on the data, wherein, responsive to the populating, the template includes the first format information and the second format information for the data type; and
    providing the template including the first and second format information for display in the user interface of the computing platform.

2. The method of claim 1, wherein the received data is free of information regarding a format thereof that varies geographically.

3. The method of claim 2, wherein the second format information is accessible to the client via the computing platform, and wherein the computing platform is free of an application program interface that allows the client to retrieve the first format information.

4. The method of claim 3, wherein the server comprises a standard component of the computing platform, wherein the client comprises a custom component of the computing platform, and wherein the generating comprises:
    receiving the output of the server at the client of the computing platform;
    extracting the first format information from a tag in the output; and
    generating the template to include the first format information.

5. The method of claim 4, wherein populating the template comprises:
    accessing a profile corresponding to a user of the client to determine the second format information;
    modifying the received data to provide modified data including the second format information responsive to the accessing the profile; and
    populating the template with the modified data.

6. The method of claim 3, further comprising the following prior to generating the template:
    defining the mock object including a field specifying the data type,
    wherein an instance of the mock object is rendered by the server based on the data type to provide the output indicative of the first format information for the data type specified in the field of the mock object, prior to generating the template.

7. The method of claim 6, wherein the mock object includes first and second fields corresponding to first and second indicators for the data type, wherein the output of the server comprises first and second outputs, and wherein generating the template comprises:
    generating, at the client, a first template associated with the first indicator based on the first output of the server; and
    generating, at the client, a second template associated with the second indicator based on the second output of the server,
    and wherein populating the template comprises populating one of the first and second templates based on a presence of one of the first and second indicators in the received data.

8. The method of claim 3, further comprising:
    displaying the template including the first format information and the second format information in the user interface at the client responsive to receiving the data for display in the user interface.

9. The method of claim 2, wherein the first locale corresponds to a geographic location of an entity for whom the computing platform is deployed, and wherein the second locale corresponds to a geographic location of one of a plurality of users associated with the entity.

10. The method of claim 9, wherein the first format information comprises currency symbol information corresponding to the geographic location of the entity, and wherein the second format information comprises separator symbol information corresponding to the geographic location of the one of the plurality of users.

11. A computer program product, comprising:
    a computer readable storage medium having computer readable program code embodied in the medium, the computer readable program code comprising:
    computer readable program code to receive, at a client of a computing platform, an output of a server of the computing platform based on definition of a mock object that specifies a data type, wherein the output of the server is indicative of first format information for the data type that is inaccessible to the client via the computing platform, and wherein the first format information is associated with a first locale;
    computer readable program code to generate, at the client, a template comprising the first format information by extracting the first format information from the output of the server;
    computer readable program code to retrieve second format information for the data type, wherein the second format information is associated with a second locale corresponding to a geographic location of the client that is different from a geographic location corresponding to the first locale;
    computer readable program code to populate the template at the client based on received data of the data type, wherein, responsive to population, the template includes the first format information and the second format information for the data type; and computer readable program code to provide the template including the first and second format information for display in a user interface of the computing platform.

12. The computer program product of claim 11, wherein the received data is free of information regarding a format thereof that varies geographically.

13. The computer program product of claim 12, wherein the second format information is accessible to the client, and wherein the computing platform is free of an application program interface that allows the client to retrieve the first format information.

14. The computer program product of claim 12, wherein the server comprises a standard component of the computing platform, wherein the client comprises a custom component of the computing platform, and wherein the computer readable program code to generate comprises:
    computer readable program code to receive the output of the server at the client of the computing platform;
    computer readable program code to extract the first format information from a Mg in the output; and
    computer readable program code to generate the template to include the first format information.

15. The computer program product of claim 14, wherein the computer readable program code to populate comprises:
    computer readable program code to access a profile corresponding to a user of the client to determine the second format information;
    computer readable program code to modify the received data to provide modified data including the second format information responsive to the access of the profile; and
    computer readable program code to populate the template with the modified data.

16. The computer program product of claim 13, further comprising:
    computer readable program code to define the mock object including a field specifying the data type,
    wherein an instance of the mock object is rendered by the server based on the data type to provide the output indicative of the first format information for the data type specified in the field of the mock object, prior to generating the template.

17. A computer system, comprising:
at least one processor; and
at least one memory coupled to the at least one processor, the at least one memory comprising computer readable program code embodied therein that, when executed by the at least one processor, causes the at least one processor to:
    receive, at a client of a computing platform, an output of a server of the computing platform based on definition of a mock object that specifies a data type, wherein the output of the server is indicative of first format information for the data type that inaccessible to the client via the computing platform, and wherein the first format information is associated with a first locale;
    generate, at the client, a template comprising the first format information by extracting the first format information from the output of the server;
    determine second format information for the data type, wherein the second format information is associated with a second locale corresponding to a geographic location of the client that is different from a geographic location corresponding to the first locale;
    populate the template at the client based on received data of the data type, wherein responsive to population, the template includes the first format information and the second format information for the data type; and
    provide the template including the first and second format information for display in a user interface of the computing platform.

18. The computer system of claim 17, wherein the received data is free of information regarding a format thereof that varies geographically.

19. The computer system of claim 18, wherein the computer system is the client of the computing platform, wherein the second format information is accessible to the client, and wherein the computing platform is free of an application program interface that allows the client to retrieve the first format information.

20. The computer system of claim 19, wherein the server comprises a standard component of the computing platform, wherein the client comprises a custom component of the computing platform, and wherein the computer readable program code causes the at least one processor to:
    receive the output of the server at the client of the computing platform;
    extract the first format information from a tag in the output; and
    generate the template to include the first format information.

21. The computer system of claim 20, wherein the computer readable program code causes the at least one processor to:
    access a profile corresponding to a user of the client to determine the second format information;
    modify the received data to provide modified data including the second format information responsive to the access of the profile; and
    populate the template with the modified data.

22. The computer system of claim 19, wherein the memory further comprises computer readable program code that, when executed by the at least one processor, causes the at least one processor to:
    define the mock object including a field specifying the data type,
    wherein an instance of the mock object is rendered by the server based on the data type to provide the output indicative of the first format information for the data type specified in the field of the mock object, prior to generating the template.

* * * * *